United States Patent [19]

Maione

[11] Patent Number: 4,528,218
[45] Date of Patent: Jul. 9, 1985

[54] DISPOSABLE DEVICE FOR SELF-HEATING OR SELF-COOLING OF DRINKS OR FOODSTUFFS BY AN EXOTHERMIC OR ENDOTHERMIC REACTION

[75] Inventor: Claudio Maione, Naples, Italy

[73] Assignee: LA "GROG" S.r.l., Naples, Italy

[21] Appl. No.: 556,200

[22] Filed: Nov. 29, 1983

[30] Foreign Application Priority Data

Dec. 7, 1982 [IT]  Italy .................. 49636 A/82

[51] Int. Cl.³ .............................................. B65D 25/08
[52] U.S. Cl. .................................... 428/35; 206/222;
220/20; 126/263; 62/4; 426/109
[58] Field of Search ..................... 206/222; 220/20;
126/263; 62/4, 294; 428/35; 426/109

[56] References Cited

U.S. PATENT DOCUMENTS 3,309,890  3/1967  Barnett et al. ............... 126/263
3,314,413  4/1967  Cambridge .................. 126/263
3,596,801  8/1971  Barnack ..................... 206/222
3,970,068  7/1976  Sato ......................... 126/263
4,043,314  8/1977  Trumble et al. .............. 126/263
4,067,440  1/1978  Lataix ....................... 206/222

Primary Examiner—John Kittle
Assistant Examiner—James J. Seidleck
Attorney, Agent, or Firm—John J. Byrne; Bradford E. Kile; Kevin M. O'Brien

[57] ABSTRACT

A disposable device for utilizing an exothermic or endothermic reaction for heating or cooling drinks and foodstuffs, substantially comprising a single piece metal container, having two rooms and being enveloped within a protective insulating plastic covering, the reactants being contained in separated sectors and closed by diaphragms, which are heat-sealed and impermeable to outer agents, the covering being provided with a locking system for locking therein the metal container and with a device, so-called outer breaker, which is manually controlled for starting the exothermic or endothermic reaction by mixing a solid reactant with a liquid one.

8 Claims, 11 Drawing Figures

U.S. Patent  Jul. 9, 1985  Sheet 1 of 4  4,528,218
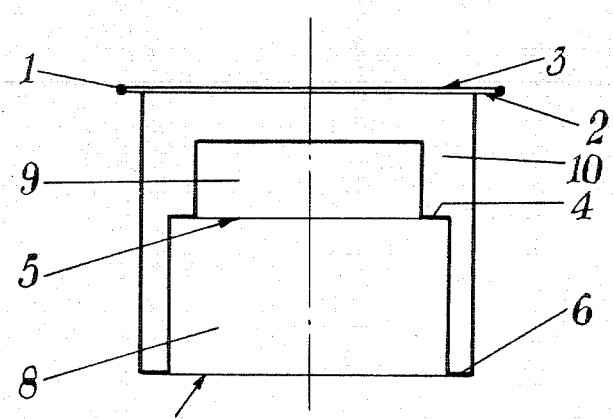
Fig. 1
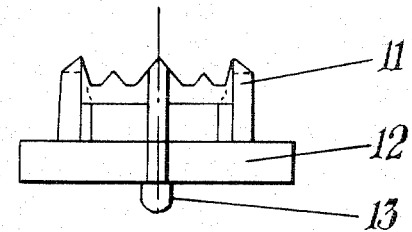
Fig. 2
Fig. 3
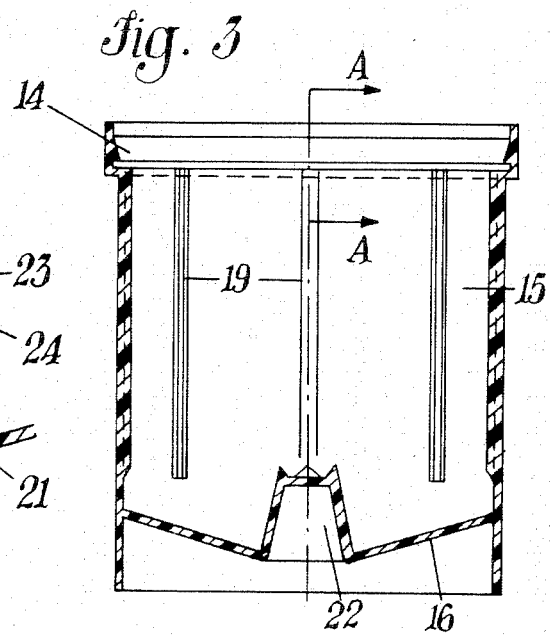
Fig. 3A
Fig. 3B
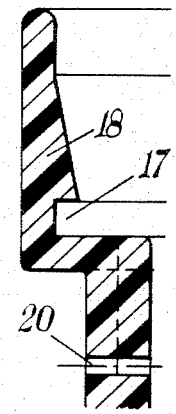

DISPOSABLE DEVICE FOR SELF-HEATING OR SELF-COOLING OF DRINKS OR FOODSTUFFS BY AN EXOTHERMIC OR ENDOTHERMIC REACTION

The present invention refers to a device for quickly heating or cooling a fluid or solid foodstuffs by means of an exothermic or endothermic reaction, which is started within the device, when the product is to be drunk or eaten up, by mixing a solid reactant with a liquid one.

There are known devices of this kind, which, however, have not had a commercial success owing to their complex structure and thus, to their high costs of production and also owing to their low effectiveness, since they do not assure a long-time conservation of the reactants and a correct operation of the device.

It is thus an object of the present invention to provide a device which avoids said drawbacks and fulfils the requirements for a maximal effectiveness.

This object is attained according to the invention by drawing said single piece metal container, preferably from an aluminium alloy sheet, said container comprising an outer room, intended for the solid or fluid foodstuff, and an inner room intended for the chemical reactants.

After the introduction of the foodstuff into the outer room, the input of said room is heat sealed with a peelable diaphragm which assures a hermetical sealing of this room. The inner room is divided into two sectors, which are separated from one another by means of a heat sealed diaphragm, sectors into which are introduced a solid and a fluid chemical reactant and which are closed by a further heat sealed diaphragm. In this way a container is obtained, in which all the components are well separated from one another and from the outside and easily accessible.

The device allowing an immediate and complete mixing of the two reactants, is carried out by providing two elements, so-called breakers. One of them is contained within the inner room together with the solid reactant, and the other one is applied, outside the metal container, to the outer plastic envelope. This outer breaker is manually operated and has the purpose to cause the endothermic or exothermic reaction to start.

The connection between the two containers, that is the metal container and plastic envelope, is done by a joining system between the circular edge on the upper portion of the metal container and a seat provided at the inner upper portion of the plastic container, so as it would not be possible to separate said two containers from one another, after the assemblage thereof, without damaging the entire device.

Summarizing, the device according to the present invention comprises a single piece aluminium alloy container including two rooms, an inner breaker, an outer perforable diaphragm, an outer container with an outer breaker and a closure cover.

The present invention will be now disclosed with reference to a preferred embodiments thereof, shown as examples only in the enclosed drawings, in which:

FIG. 1 shows a single piece container having two rooms;

FIG. 2 shows an inner breaker to be arranged within one of the two rooms of the container shown in FIG. 1;

FIG. 3 shows an outer container which includes the container of FIG. 1 and is provided with an outer breaker;

FIG. 3A shows in an enlarged view the outer breaker bearing the reference numeral B in FIG. 3;

FIG. 3B shows an enlarged section view along the line A—A in FIG. 3;

Figure 4:
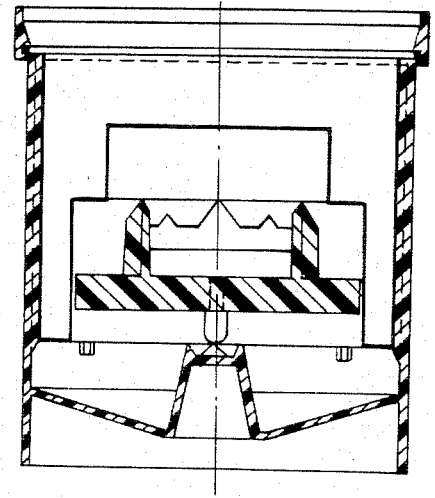
FIG. 4 shows the assembled device in the rest position.
Figure 5:
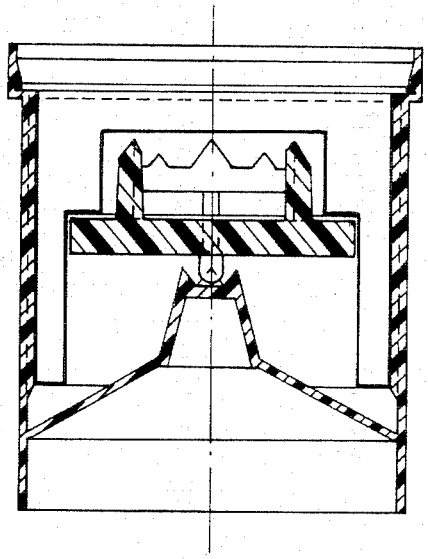
FIG. 5 shows the device of FIG. 4 in the operative position.

In FIG. 1 the reference numeral 1 indicates the perimetral edge of a sealing foil 2 for the heat sealing of a peelable diaphragm 3. The references numeral 4 indicates an inner support for a perforable inner diaphragm 5, the numeral 6 is an outer support for a perforable outer diaphragm 7 and the reference numerals 8, 9 and 10 indicate, respectively, a room for a solid reactant and an inner breaker, a room for a liquid reactant and a room for the liquid or solid foodstuff.

The rolled section, from which the metal container is drawn. is rendered heat sealable by coating both faces with a heat sealable lac or thin plastic layer. In said one-piece metal container with two rooms, the room 10 contains the foodstuff to be heated or cooled. After having introduced the foodstuff, the outer room is heat sealed with the peelable diaphragm 3, which will be removed before using the foodstuff.

Said diaphragm 3 consists of an impermeable material which assures a long conservation of the food product contained within the outer room 10.

Within the inner room are placed the reactants, namely, the liquid one within the room 9 which is then sealed by the perforable inner diaphragm 5, and the solid one, together with the inner breaker, within the room 8.

This last room is, in turn, separated from the outside by the perforable, heat sealed outer diaphragm 7, which protects the content from the outside influences. It is, thus, assured that the reactants are not subject to alterations or interactions during the conservation period of the entire device.

The inner breaker shown in FIG. 2 consists of a crown 11 adapted to break the perforable inner diaphragm of the metal container to cause the liquid reactant to flow out. The centering tongues 12 allow to maintain the central position within the reaction room. On the lower face of the inner breaker a protuberance 13 is provided, which receives the upward thrust from the outer breaker.

The perforable outer diaphragm 5 is, as a structural component of the container, of great importance, since as before said, assures the conservation of the solid reactant against any outside influence and will be perforated, on the actuation of the device, by the outer breaker.

The operation of the device according to the present invention is based on that a pressure exerted on the outer breaker, fastened on the lower base of the outer container, causes in succession: the rupture of the perforable outer diaphragm, the upward thrust of the inner breaker, the rupture of the perforable inner diaphragm by said inner breaker, the outflow of the liquid reactant, the contact between the liquid and solid reactants, an exothermic or endothermic reaction and the discharge of the induced pressure.

There are, substantially, two operative techniques for attaining the succesion of the above said phenomena, and namely:

(1) upward displacement of the movable outer breaker and (2) downward motion of the metal container onto the stationary outer breaker.

Two embodiment of said techniques will be now disclosed on hand of the drawings.

The outer container, with the movable outer breaker, as shown in FIG. 3, consists of an upper fastening sector 14, a protecting and insulating side sector 15 and a lower control sector 16.

The upper fastening sector 14 includes a circular seat 17 for the perimetral edge of the container foil and a perimetral fastening hook 18.

The forced introduction of the metal container into the outer plastic container causes said containers to firmly join to one another, as the perimetral edge 1 of the container foil fits into the seat 17.

The protecting and insulating side sector is provided with inner ribs 19 which maintain in correct position the metal container and form insulating air spaces. In the upper zone pressure discharge holes 20 are provided.

The lower control sector 16 consists of a frustoconic convex bottom having at the truncated portion the control zones 21, the inner portion of said bottom forming the outer breaker.

A pressure exerted on the control areas causes an inward bending of the bottom which assumes a symmetrical position, with a consequent inward displacement of the outer breaker, which causes the entire device to operate by perforating with its toothed crown 23 the outer diaphragm 7 and upwardly displacing, by its central portion 24, the inner breaker having a toothed crown 11 adapted to perforate the inner diaphragm 5.

Figure 6:
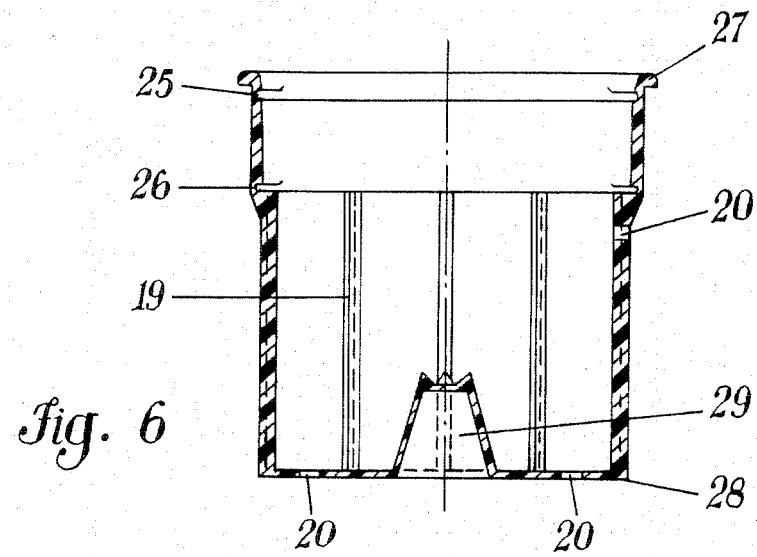
FIG. 6 shows a second embodiment of the device according to the invention, in which the outer breaker is stationary one.

The outer container, provided with the stationary outer breaker, shown in FIG. 6, consists of a container and a control cover.

The upper fastening sector has two inner circular seats 25 and 26. For assembling the device, the metal container is introduced into the outer container by pushing it up to a position, in which the perimetral edge of the covering foil enters into the upper seat 25, thus forming a firmly joined assembly, whereas a further pressure exerted onto the metal container will cause said container to dip down at the level of the lower seat 26, as it will be disclosed hereafter.

The upper opening of the outer container is provided with an edge 27 for fastening the cover thereon.

Also in this case the protecting and insulating side is provided with inner ribs 19 which maintain in correct position the metal container and form insulating air spaces. The pressure discharge holes 20 are provided in this case in the lower zone.

The lower zone includes the outer breaker 28 and consists of a plane bottom and of the inner breaker 29 extending into the inner portion of the container and formed on the central portion of the plane bottom.

Figure 7:
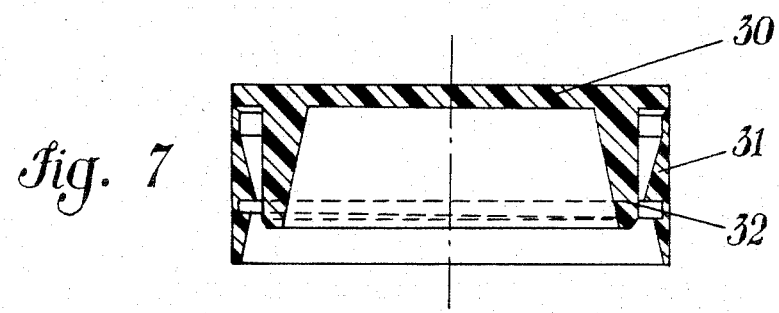
FIG. 7 shows a cover for the embodiment of FIG. 6.

The cover consists of an abutting plane 30, an envelopping security band 31 and a control crown 32, as shown in FIG. 7.

The abutting plane 30 is formed by the annular upper surface which is intended for the connection with the other two parts and, on the operation of the entire device, forms the zone in which a pressure should be exerted for starting the endothermic or exothermic reaction.

The security tear band 31 is fastened, on the assemblage of the device, on the edge 27 of the outer container so as to avoid an unintentional action on the cover, so as to guarantee that the device has not yet been used. Contemporaneously it protects from any contamination the zone which will come into contact with the user lips. On the operation of the device the security band 31 is teared for releasing the cover and allowing to exert a pressure thereon so as to cause the control crown 32 to lower into the inner room of the outer container. The control crown has the purpose to pull down the metal container from the position corresponding to the upper seat 25 into the position corresponding to the lower seat 26, causing thus all the phenomena to start for actuating the device.

Figure 8:
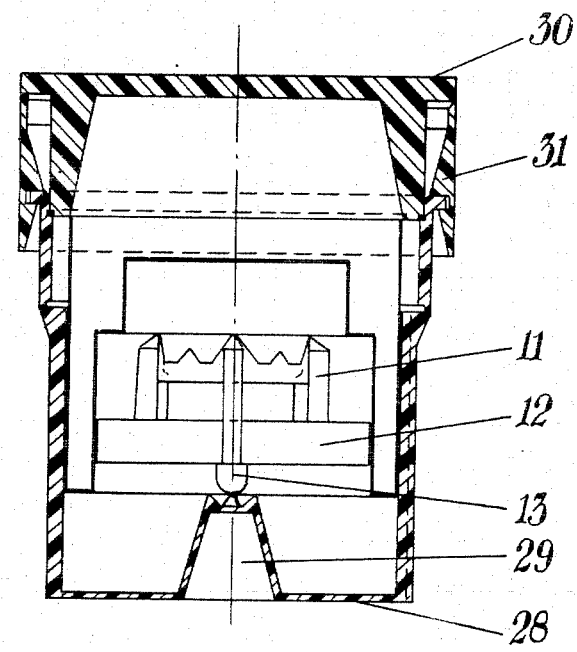
FIG. 8 shows the device of FIG. 6 with the cover of FIG. 7, in the rest position
Figure 9:
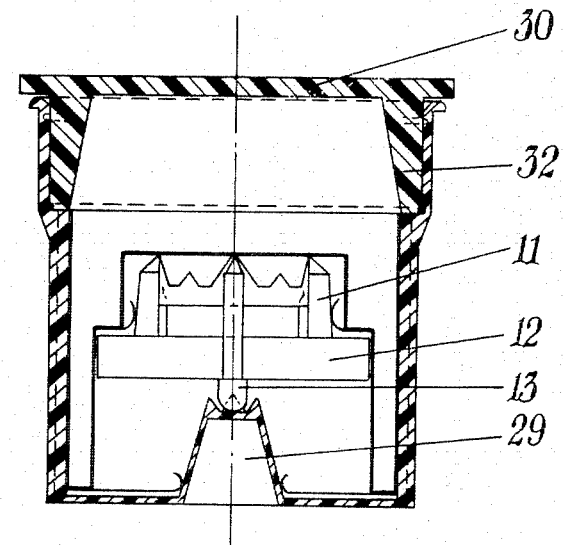
FIG. 9 shows the device of FIG. 8 in the operative position.

FIG. 8 shows the entire device in its rest position, whereas FIG. 9 shows the device in the conditions, which it assumes after the cover has been pushed down for causing the endothermic or exothermic reaction to start by the outflow of the liquid reactant from the room 9 into the room 8 containing the solid reactant.

The present invention has been disclosed with reference to the two preferred embodiments thereof, it being however understood that several changes and variations may performed within the protection scope of the invention itself.

I claim:

1. A disposable container for heating or cooling a liquid or solid food product contained therein by exothermic or endothermic reaction, characterized in that it comprises a metal container formed with an inner and outer room by a partition, the outer room holding foodstuff or liquid for ingestion, and the inner room holding a solid and a liquid chemical reaction agent; the inner room being further partitioned into two compartments one directly above the other, separated by a diaphragm, the upper compartment containing said liquid reactant and the lower compartment containing a non-stationary inner breaker and said solid reactant, said solid reactant being placed on top of said non-stationary inner breaker;

a plastic insulating container firmly attached to and enveloping outer perimeters of said metal container;

an outer breaker means within said plastic container but external to said metal container for causing said non-stationary inner breaker to pierce through said diaphragm thus moving said solid reactant into said upper compartment so as to cause instantaneous and thorough mixing of the solid and liquid reactants.

2. A device according to claim 1 characterized in that the metal container is provided with a foil to be joined with a peelable closure diaphragm having a perimetral edge intended to enter a groove provided in the upper portion of the plastic container so as to firmly connect said two containers with one another.

3. A device according to claim 1 characterized in that the inner breaker has a toothed crown having the purpose to perforate the diaphragm which separates the two reactants from one another, centering wings being provided for maintaining the breaker in a correct position, said inner breaker having also a thrust shank adapted to receive the lifting action of the outer breaker.

4. A device according to claim 1 characterized in that the outer plastic container carries on its inner side wall a plurality of ribs which maintain said wall at a certain distance from the coaxial metal container and form insulating air spaces.

5. A device according to claims 1, 2, 3, or 4 characterized in that the plastic container has holes for discharging the pressure.

6. A device according to claim 1 characterized in that the outer plastic container is closed at its lower position by a inwardly bended frustoconical wall, having at its outer surface a control zone.

7. A device according to claim 1 characterized in that the plastic container has a circular upper seat and a circular lower seat, which correspond to the two stationary portions of the metal container, namely a rest position when the edge of the foil of the metal container enters the upper circular seat and an operating position, into which the metal container is pushed down and its edge enters the lower seat, the outer breaker means being stationarily arranged on the bottom of the plastic container.

8. A device according to claim 7, characterized in that it is provided with a security cover having a security tear band and being firmly connected with the metal container, so that under the thrust action it lowers the metal container causing thus the rupture of the separation diaphragms by the action of the inner breaker and the outer breaker means and starting the endothermic or exothermic reaction.

* * * * *